(12) United States Patent
Streb et al.

(10) Patent No.: US 12,312,242 B2
(45) Date of Patent: May 27, 2025

(54) PRESSURE SWING ADSORPTION PROCESS FOR PRODUCING HYDROGEN AND CARBON DIOXIDE

(71) Applicant: CASALE SA, Lugano (CH)

(72) Inventors: Anne Streb, Zurich (CH); Max Hefti, Zurich (CH); Matteo Gazzani, Utrecht (NL); Marco Mazzotti, Zurich (CH)

(73) Assignee: CASALE SA, Lugano (CH)

( * ) Notice: Subject to any disclaimer, the term of this patent is extended or adjusted under 35 U.S.C. 154(b) by 522 days.

(21) Appl. No.: 17/594,633

(22) PCT Filed: Apr. 21, 2020

(86) PCT No.: PCT/EP2020/061109
§ 371 (c)(1),
(2) Date: Oct. 25, 2021

(87) PCT Pub. No.: WO2020/221629
PCT Pub. Date: Nov. 5, 2020

(65) Prior Publication Data
US 2022/0185666 A1  Jun. 16, 2022

(30) Foreign Application Priority Data
May 2, 2019 (EP) .................................... 19172384

(51) Int. Cl.
C01B 3/56 (2006.01)
B01D 53/047 (2006.01)
C01B 32/50 (2017.01)

(52) U.S. Cl.
CPC ............ *C01B 3/56* (2013.01); *B01D 53/0476* (2013.01); *C01B 32/50* (2017.08);
(Continued)

(58) Field of Classification Search
None
See application file for complete search history.

(56) References Cited

U.S. PATENT DOCUMENTS

| 4,963,339 | A | | 10/1990 | Krishnamurthy et al. |
| 5,026,406 | A | * | 6/1991 | Kumar ............... B01D 53/0476 95/143 |

(Continued)

FOREIGN PATENT DOCUMENTS

| AU | 2016201267 A1 | * | 3/2016 |
| AU | 2016201267 B2 | | 9/2016 |

(Continued)

OTHER PUBLICATIONS

"Basic Chemical Engineering", Wuhan University, Jul. 31, 2001, pp. 1-8.

(Continued)

*Primary Examiner* — Brian A McCaig
(74) *Attorney, Agent, or Firm* — Dorsey & Whitney LLP

(57) ABSTRACT

A pressure swing adsorption process (PSA) comprising the following steps: feeding an input gas containing $H_2$, $CO_2$ and impurities through a $CO_2$ adsorbent material in a pressure vessel under a high pressure; withdrawing a first $H_2$-rich product gas due to adsorption of $CO_2$ in the adsorbent material; setting the pressure to an intermediate pressure causing the adsorbent material to release a second gas stream; passing a $CO_2$-rich purge stream through the adsorbent material, obtaining a purge gas; setting the pressure to a sub-atmospheric low pressure, so that a $CO_2$-rich product gas is released under vacuum by the adsorbent material; re-pressurizing the vessel to said high pressure; said steps being performed cyclically in a pressure vessel or in a plurality of parallel pressure vessels of a multiple vessel setup.

22 Claims, 4 Drawing Sheets

(52) U.S. Cl.
CPC ...... *B01D 2256/16* (2013.01); *B01D 2256/22* (2013.01); *B01D 2257/102* (2013.01); *B01D 2259/40016* (2013.01); *B01D 2259/40032* (2013.01); *B01D 2259/40043* (2013.01); *B01D 2259/40052* (2013.01)

(56) References Cited

U.S. PATENT DOCUMENTS

| | | |
|---|---|---|
| 8,591,769 B2 | 11/2013 | Vauk et al. |
| 2012/0234165 A1* | 9/2012 | Elseviers .................. C01B 3/56 95/11 |

FOREIGN PATENT DOCUMENTS

| | | |
|---|---|---|
| EP | 0398339 A2 | 11/1990 |
| EP | 2524726 A1 | 11/2012 |
| WO | 2007123673 A1 | 1/2007 |
| WO | 2008039771 A2 | 4/2008 |
| WO | 2018118105 A1 | 6/2018 |

OTHER PUBLICATIONS

Shiyong, "Environment and Industrial Gas Purification Technology", Environmental Science and Engineering Publishing Center and Chemical Industry Press, May 31, 2001, pp. 1-6.
International Preliminary Report on Patentability for International Application No. PCT/EP2020/061109 mailed Aug. 9, 2021.
International Search Report from International Application No. PCT/EP2020/061109 mailed Jun. 4, 2020.

\* cited by examiner

PRESSURE SWING ADSORPTION PROCESS FOR PRODUCING HYDROGEN AND CARBON DIOXIDE

FIELD OF THE INVENTION

The present invention relates to recovery of $H_2$ and $CO_2$ from an input gas with a pressure swing adsorption (PSA) process.

PRIOR ART

Pressure swing adsorption is a commercial technology applicable to recovery of one or more target components from a gaseous mixture. For example a field of great interest for PSA is the separation of $H_2$ (light component) or of $CO_2$ (heavy component) from a feed gas. The feed gas for example is a gas obtained by reforming of a hydrocarbon. Further to $H_2$ and $CO_2$, the feed gas may contain impurities such as $N_2$, CO and $CH_4$.

In the prior art of $H_2$ and $CO_2$ recovery via PSA, the feed gas is passed through an adsorbent material with a strong affinity for $CO_2$. The adsorbent material binds molecules of $CO_2$ so that $CO_2$ is captured and the remaining gas is rich of $H_2$. This adsorption step is performed under a high pressure. By lowering the pressure, the captured $CO_2$ is liberated in the form of a $CO_2$-rich stream and the adsorbent material is regenerated. In some embodiments, regeneration is performed at subatmospheric pressure, which is termed vacuum pressure swing adsorption (VPSA).

A PSA process can therefore deliver a $H_2$-rich stream and a $CO_2$-rich stream.

Known improvements to the above described basic PSA process include purge and rinse steps and performing the process in a multiple columns setup. The process may be performed cyclically in a suitable pressure vessel, usually a vertical pressure vessel (column). A preferred embodiment of a plant for performing said process, however, includes a setup of several reactors running in parallel.

Among others, WO 2008/039771 discloses a process featuring a VPSA for the recovery of $CO_2$ and a PSA for the recovery of hydrogen. WO 2007/123673 discloses a process featuring a VPSA for the recovery of $CO_2$ and an additional purification unit. EP 2 524 726 discloses a cyclic PSA process including a blowdown phase consisting in lowering the pressure in the adsorbent bed wherein the blowdown phase is divided into several partial blowdown phases and gas streams discharged during the partial blowdown phases are introduced into respective discharge tanks.

A major challenge is the purity of the recovered $H_2$ and $CO_2$. Prior art PSA units can deliver a high purity of either $H_2$ or $CO_2$. When a high purity (e.g. >90%) and high rate of recovery (e.g. >80%) of both $H_2$ and $CO_2$ are required, however, the recovery of both high-purity streams from the same column is not possible and the prior art requires two different separation units: for example two PSA units or a PSA unit and a TSA (temperature swing adsorption) unit, or a PSA unit followed by cryogenic separation. A related drawback is the increased complexity and capital cost of the plant to perform such separation. This problem is even more challenging when the feed gas contains multiple impurities e.g. $N_2$ or $CH_4$. The term of impurities denotes any component other than the targeted light product ($H_2$) and heavy product ($CO_2$).

EP 0 398 339 discloses a PSA process for producing two gas streams from a gas mixture, wherein for example a SMR gas is separated into a CO2 product and a second stream which contain the remaining components: H2, CH4, N2, CO.

AU 2016 201 267 discloses a process for separating hydrogen and carbon dioxide from the tail gas of a PSA unit (refinery steam methane reforming Hydrogen PSA) in a multiple stage adsorption process comprising a low pressure CO2 swing adsorption for producing high purity CO2 from the tail gas and a hydrogen pressure swing adsorption for producing high purity hydrogen from the CO2-lean gas generated in the low pressure CO2 swing adsorption.

U.S. Pat. No. 4,963,339 describes hydrogen and carbon dioxide coproduction wherein the effluent of a steam reformer and shift converter is passed through a hydrogen PSA unit followed by an uncoupled carbon dioxide PSA unit.

SUMMARY OF THE INVENTION

The aim of the invention is to provide a PSA process which can be carried out with a high recovery of $H_2$ in the $H_2$-stream and $CO_2$ in the $CO_2$-stream. Another aim of the invention is to improve a PSA process carried out in a setup including multiple pressure vessels. Still another aim is to solve the problem of how to process a gas stream comprising a substantial amount of impurities, so that a separation into two product, e.g. a light product and a heavy product, is not satisfactory.

The aim is reached with a pressure swing adsorption process according to claim 1. Preferred features of the process are stated in the dependent claims.

The process comprises at least the following steps:
a) feeding an input gas containing $H_2$, $CO_2$ and other components or impurities through an adsorbent material suitable to adsorb $CO_2$, in a pressure vessel under a high pressure, and withdrawing from the pressure vessel a first gas stream which is a $H_2$-rich product gas containing less $CO_2$ and impurities than the input gas due to adsorption of $CO_2$ and impurities in the adsorbent material;
b) lowering the pressure in the pressure vessel to an intermediate pressure, which is lower than said high pressure, causing the adsorbent material to release a second gas stream, which is a waste gas containing impurities, $CO_2$ and $H_2$, and withdrawing said second gas from the pressure vessel;
c) purging the adsorbent material by passing a $CO_2$-rich purge stream through the adsorbent material, obtaining a third gas which is a purge gas containing mainly impurities desorbed from the material, and withdrawing said third gas from the pressure vessel;
d) further lowering the pressure in the pressure vessel to a low pressure, which is lower than said intermediate pressure, and is a sub-atmospheric pressure, causing the adsorbent material to release under vacuum a fourth gas stream, which is a $CO_2$-rich product gas containing $CO_2$ desorbed from the material, and withdrawing said fourth gas from the pressure vessel;
e) re-pressurizing the vessel to said high pressure,
wherein said steps a) to e) are performed cyclically in said pressure vessel or in parallel vessels of a multiple vessel setup.

As a result of the above steps, CO2 and H2 contained in the input gas are recovered separately in the H2-rich stream and in the CO2-rich stream respectively, and impurities are collected in at least one further stream.

Therefore the process of the invention produces a high purity product stream of H2, a high purity product stream of CO2, and at least one other stream containing the impurities. The stream containing the impurities may include the second gas stream obtained at step b) and the third gas stream obtained at step c). This stream of impurities is a waste stream which is not recycled to into the process, for example it is not reintroduced into the input feed gas. This stream of impurities may be suitably discharged.

In an embodiment, the process of the invention may result in the separation of the input gas into H2 product stream with a purity greater than 99%, a CO2 product stream with a purity greater than 96% and a third stream containing the impurities. The input gas may be a steam methane reforming (SMR) gas.

Another remarkable feature of the invention is that H2 and CO2 purification are performed within the same PSA stage. The invention does not require separate PSA stages for H2 purification and CO2 purification. The invention achieves H2 and CO2 purification with one single PSA.

The process of the invention is preferably performed in a multiple vessel setup including a plurality of pressure vessels running in parallel, wherein each pressure vessel performs the above steps a) to e) cyclically.

The number of the pressure vessels may vary; in most applications the number of the pressure vessels may vary from 2 to 12.

One or more process stream(s) may be exchanged between the above steps. A stream originated during a process step may be used to perform another step of the inventive process. This feature is particularly interesting in a multiple-vessel setup where the vessels of a setup may exchange process streams. For example, a stream originated from one or more vessels performing a first process steps may be used as a process stream for performing a second process step in one or more vessels. A process stream may be transferred directly from a source vessel to a target vessel if the first process step(s) and second process step(s) take place simultaneously; a process may also be temporarily stored in a tank for a subsequent use.

A process stream may include, among others, a purge stream which helps remove impurities and/or helps full regeneration of the adsorbent material, or a pressurizing medium. For example a purge gas used in the step c) and/or a pressurizing gas used in the step e) may include a gas stream originated from the same or another pressure vessel of the setup while performing another process step. Various preferred embodiments will be described below in a greater detail.

The term pressure vessel preferably denotes a vertical reactor, i.e. a column.

PREFERRED EMBODIMENTS

In a preferred application the input gas (feed gas) contains relevant amounts of $CO_2$ and $H_2$. The input gas may contain at least 40% of $H_2$ and may contain at least 20% of $CO_2$ according to preferred embodiments. In a preferred application $H_2$ and $CO_2$ together account for at least 50% of the feed gas. In some embodiments the amount of one or more of the impurities, particularly nitrogen, may be greater than the amount of $H_2$ or of $CO_2$. All the amounts are in % vol (by volume) unless otherwise indicated.

The term impurities denotes one or more component other than $H_2$ and $CO_2$. For example the impurities may include one or more of $N_2$, CO, $CH_4$.

For example: a first exemplary composition of an input gas includes around 50% $H_2$, 25% $CO_2$ and 25% $N_2$; a second exemplary composition of an input gas includes around 45% $H_2$, 25% $CO_2$ and 30% $N_2$.

The $H_2$-rich product gas obtained at step a) may be a substantially $CO_2$-free gas. Preferably said $H_2$-rich gas has a $H_2$ concentration of at least 95% by volume. More preferably said $H_2$-rich gas contains at least 99% hydrogen. In some embodiments it may contain even 99.9% or more hydrogen.

The second gas (waste gas) withdrawn at step b) typically contains a low amount of $CO_2$ and an amount of $H_2$ which progressively decreases during the step b) (blowdown step) as the pressure decreases and the gas becomes enriched in impurities. At the beginning of said step b), said second gas may be rich in hydrogen whilst at the end of the step b) said second gas typically contains mainly impurities and low amounts of both $CO_2$ and $H_2$.

The step c) causes the $CO_2$ contained in the purge stream to replace impurities in the adsorbent material due to a stronger affinity of $CO_2$ with the adsorbent material, compared with the affinity of the impurities.

The $CO_2$ product gas obtained at step d) may be a substantially pure $CO_2$ stream. Preferably said $CO_2$-rich product gas has a $CO_2$ concentration of at least 90% by volume, more preferably greater than 95% by volume.

Preferably the removal of $CO_2$ (i.e. the amount of $CO_2$ initially contained in the feed gas which is removed) is 90% or more, and the recovery of $H_2$ (i.e. the amount of $H_2$ initially contained in the feed gas which is recovered in the $H_2$-stream) is 90% or more.

The sub-atmospheric pressure is a pressure below 1 atm absolute. The symbol atm denotes the standard atmospheric pressure, i.e. 101325 Pa.

The present invention provides integration of both hydrogen purification and $CO_2$ separation within one adsorption cycle including the above sequence of steps. Thanks to the configuration of the adsorption cycle, the co-production of $H_2$ and $CO_2$ is performed in a single separation unit. Particularly, the invention does not require an additional separation stage therefore leading to a significant reduction in capital and energy costs. The invention combines the PSA steps in an innovative way so that not only $H_2$, but also $CO_2$ can be produced at high purity and high recovery within the same cycle whilst impurities (e.g. $CH_4$, CO, $N_2$) are rejected as one or more separate waste streams.

The step a) is preferably performed by passing the input gas from bottom to top of the pressure vessel and the first gas stream ($H_2$ product stream) is withdrawn from top of the vessel.

The step a) is preferably performed in such a way that adsorbent material located in the upper part of the vessel is not saturated with $CO_2$. This unsaturated material can be an upper part of an adsorbent bed, a layer of adsorbent within a single bed, and/or an upper adsorbent bed in a multiple-bed vessel.

In the step b), a waste stream is produced which is richer in impurities than the feed stream. This stream can be used as a fuel, for example in a fired reformer, in some embodiments of the invention, for example when the PSA process of the invention is performed as part of a reforming process of a hydrocarbon feed to produce a $H_2$-containing gas. An interesting embodiment is the production of a make-up gas for the synthesis of ammonia.

The step b) preferably includes lowering the pressure by blowing down the pressure vessel from the upper part of the vessel and the second stream is withdrawn from top of the vessel. Particularly, a blown down from top is advantageous in combination with the above preferred feature of leaving unsaturated adsorbent material in the upper part of the vessel.

According to this preferred embodiment, the vessel is blown down from the top end to an intermediate pressure level, with most of the impurities blowing out from the top end of the column together with the remaining hydrogen. The $CO_2$ that desorbs in the lower part of the vessel is re-adsorbed in the yet unsaturated upper part of the same. At the end of this step, there is a small amount of impurities at the top end of the column in the gas phase and the adsorbed phase, and the $CO_2$ front reaches further up the column.

Preferably the step b) is carried out directly after the step a) without intermediate process steps in between.

The step c) is preferably performed by passing the $CO_2$-rich purge stream from bottom to top of the vessel.

An advantage of performing said purge from bottom to top is that the column gas phase is progressively replaced with high purity $CO_2$ starting from the bottom and any adsorbed impurities at the bottom of the vessel are replaced by $CO_2$ due to the stronger affinity of the $CO_2$ for the adsorbent and to higher partial pressure of $CO_2$. During this step, a stream with initially a high concentration of impurities leaves the vessel from the top end. After completion of this step, the vessel contains very little impurities and can produce a substantially pure carbon dioxide stream.

The fourth gas, that is the $CO_2$-rich product gas, is preferably withdrawn from the bottom of the vessel.

$CO_2$ is recovered through a sub-atmospheric evacuation from the bottom end of the vessel. Drawing the vacuum from the bottom end avoids a re-adsorption of the $CO_2$ at the column top end. This increases the $CO_2$ production on one hand, and avoids a contamination of the top end of the vessel with $CO_2$ to the benefit of the purity of the $H_2$ product.

The step e) may include a plurality of pressurization steps performed with the same or a different pressurizing medium.

Each of the steps a) to e) has appropriate time duration.

The process may also include one or more of the following optional steps, alone or in combination, particularly in a multiple-vessel setup.

A first option is to perform the purge of step c) using the $CO_2$ product gas generated by step d). Accordingly, the $CO_2$-rich purge stream admitted at step c) may include $CO_2$-rich product gas originated from step d) of at least one pressure vessel. A related advantage is increased performance in terms of purity of the heavy product ($CO_2$).

A second option is to perform a partial re-pressurization of a vessel using part of the pressurized hydrogen rich stream withdrawn during a depressurization step. For example the step e) may include feeding, as a pressurizing medium, at least part of the second gas stream originated from step b). As stated before, said second gas withdrawn from step b) is initially rich in hydrogen and then, as the blowdown is in progress, contains more and more impurities. A related advantage is enhanced recovery of hydrogen.

A third option is to perform a final re-pressurization using part of the light product instead of the feed stream. For example the step e) may include the feeding, as a pressurizing medium, of at least part of the $H_2$-rich product gas originated during step a). A related advantage is increase of the purity of the light product ($H_2$).

In a preferred embodiment, the step e) includes a first pressurization step e1) with the second gas stream from step b), up to an intermediate pressure (recycle pressurization), followed by a final pressurization step e2) with $H_2$-rich product gas from step a), to reach the feed pressure.

A fourth option is to perform the step b) in two or more sub-steps. The target intermediate pressure of step b) is reached by de-pressurizing the vessel through two or more sub-steps. In a preferred embodiment the step b) includes: a first step b1) of lowering the pressure to a first intermediate pressure and withdrawing a first stream containing hydrogen, impurities and small amount of $CO_2$; then a second step b2) of further lowering the pressure to the target intermediate pressure and withdrawing a second stream containing impurities and small amount of $H_2$ and $CO_2$.

In a particularly preferred embodiment, a multi-step depressurization is combined with a multiple-step re-pressurization. Particularly preferably, said first stream obtained in step b2) is used as a pressurizing medium in a recycle pressurization step for example in the above mentioned step e1).

A fifth option includes an additional purge step which is performed after the step d) and before the step e), wherein said additional purge step is performed using part of $H_2$-rich product gas produced by the same or another vessel, and said additional purge step produce an additional $CO_2$-rich stream preferably withdrawn from bottom of the vessel. Said additional purge step may also be performed using a stream obtained from the blowdown step b) of at least another vessel.

At least part of said additional $CO_2$-rich stream produced in the additional purge step may be used to perform the step c) of the same or another vessel.

A very important advantage of this option is the purge and recovery of $CO_2$ still adsorbed after the evacuation step. The applicant has noted that, at the end of the evacuation step, a vessel (e.g. a column) may not be fully regenerated and may still contain significant amounts of adsorbed $CO_2$. The invention provides that the vessel is purged with a pure hydrogen stream from the top end. The top end is cleaned of impurities, the latter being replaced by hydrogen, both in the gas phase and in the adsorbed phase, and additional $CO_2$ is produced. The advantages include:

the loss of $H_2$ is significantly lower compared to the purge step of a conventional PSA due to the lower pressure due to the sub-atmospheric pressure of the evacuation step;

additional $CO_2$ is desorbed that can be used for purging another vessel instead of using product $CO_2$, thereby increasing the $CO_2$ rate of recovery;

due to a better regeneration, the adsorbent can adsorb more $CO_2$ and impurities in the next cycle leading to a longer duration of the adsorption step and therefore an increased productivity.

The applicant has found that at the desorption pressure of many commercial materials, e.g. zeolites and activated carbons, the adsorption of CO2 even at low partial pressures, e.g. 0.1 bar, is still high. After regeneration by evacuation only, this amount therefore is still in the column, being adsorbed. By purging with a H2 stream, the concentration of CO2 in the column decreases, thereby decreasing the partial pressure, and thus additional CO2 is desorbed releasing a stream rich in CO2.

In this light purge step, which is performed between steps d) and e), another stream rich in CO2 is produced to purge the column in step c) either together with the gas from step d) or not.

All the above options are particularly interesting in a multiple column setup wherein the above described process steps are performed cyclically in different pressure vessels. Also, one or more process streams may be exchanged between the pressure vessels. For example in the first option, the CO2-rich purge stream admitted at step c) includes preferably CO2-rich product gas originated from step d) of at least another pressure vessel. The same is applicable to the other options.

A particularly preferred embodiment of the invention is a process comprising:
  i) adsorption bottom to top at a high pressure producing a $H_2$-rich hydrogen product stream,
  ii) depressurization from top to a first intermediate pressure and production of a first stream containing hydrogen, impurities and small amounts of $CO_2$,
  iii) depressurization from top to a second intermediate pressure and production of a second stream containing impurities and small amounts of $H_2$ and $CO_2$,
  iv) purge with a $CO_2$-rich purge stream bottom to top and withdrawal of a stream rich of impurities and containing a small amount of $CO_2$,
  v) depressurization to sub-atmospheric pressure and production of a first $CO_2$-rich product stream from bottom,
  vi) purge under vacuum top to bottom using part of the hydrogen product produced during step i), obtaining a second $CO_2$-rich product stream,
  vii) a first pressurization by feeding in the pressure vessel bottom to top at least part of the stream withdrawn from step ii),
  viii) a final pressurization by feeding in the pressure vessel top to bottom a part of the hydrogen product produced at step i).

The $H_2$-rich hydrogen product stream obtained at step i) may be substantially pure hydrogen. Part of this hydrogen product can be used in step vi) as a purge medium and in step viii) as a pressurizing medium.

The de-pressurization is performed in two steps, namely ii) and iii).

The step ii) can be termed a recycle de-pressurization step, as the produced $CO_2$-containing steam, although it contains some impurities, can be internally re-used in step vii) as a pressurization medium.

The step iii) can be termed a waste de-pressurization as the produced $CO_2$-containing stream is rich of impurities and contains low $H_2$ and $CO_2$ making it less interesting to recycle; this stream therefore is generally wasted or used to fuel a fired heater, e.g. a primary reformer.

Step iv) is a first purge step. This step is preferably performed purging from the bottom end of the vessel and using a $CO_2$ rich stream, either from step v) or step vi) or a mixture thereof. During this step iv) the impurities that are still adsorbed are displaced by the more strongly adsorbing $CO_2$, and the gas in the voids of the adsorbent material is replaced by a $CO_2$-rich gas. The stream withdrawn from the vessel during said step iv) is a stream enriched in impurities with small amounts of $CO_2$ and $H_2$.

During step v), the vessel is depressurized below atmospheric pressure. The vessel is depressurized preferably from the bottom end, that is to say with opposite flow direction with respect to the previous steps. The vessel is brought to a pressure less than 1 atm absolute, to produce a high purity $CO_2$ product stream. Part of said $CO_2$ product stream can be used as a purge medium in the step iv).

Step vi) is a second purge step. The vessel is purged preferably from the top end under vacuum using part of the hydrogen product withdrawn at step i). During the purge, the top end of the vessel is cleaned from impurities and from $CO_2$. The initial part of the outlet stream from said step vi) is rich in $CO_2$ and may form part of a $CO_2$ rich gas used for the first purge step iv).

The step vii) is a recycle pressurization. The vessel is pressurized using the hydrogen rich stream from step ii). The final pressure is usually below the highest pressure of step i).

The step viii) is a final pressurization to reach the feed pressure.

All recycles can be performed as direct recycles or can include intermediate storage in one or more intermediate storage tanks. Intermediate storage may be preferred for a greater flexibility in terms of scheduling.

Preferably the above mentioned process involving steps i) to viii) is performed in a multiple setup. According to the multiple-setup embodiment, one or more of the following features can be implemented:
  the step vi) comprising purge under vacuum using part of the hydrogen product produced by step i) in at least another vessel of the setup;
  the step vii) comprising feeding at least part of the stream originated from step ii) of at least another vessel of the setup;
  the step viii) comprising feeding in the pressure vessel a part of the hydrogen product produced by at least another vessel of the setup at step i).

Still other options are the following.

The step i) can be time split in several sub-steps each sending the so obtained $H_2$ product to different cycle steps. One or more of said sub-steps delivers the $H_2$ final product. In an embodiment the step i) includes: a first step i-1) recycling all product to the pressurization step viii) of at least another vessel; a second step i-2) where the obtained $H_2$ product is directed to the purge step vi) of at least another vessel; a third step i-3) delivering the hydrogen product. Each of said sub-steps has appropriate time duration.

Step iv) can be carried out at a pressure above ambient pressure, at substantially ambient pressure, or below ambient pressure. In the latter case, step iii) may include two sub-steps, namely: a first step iii-1) of a blowdown to atmospheric pressure; a second step iii-2) of intermediate evacuation.

Step v) may include a first substep v-1) and a second substep v-2) wherein one of said first substep v-1) and second substep v-2) produces a $CO_2$-containing stream entirely recycled to the step iv) of one or more vessels and the other one of said two substeps v-1), v-2) delivers the $CO_2$ product.

Step vi) may include a first substep vi-1), a second substep vi-2) and a third substep vi-3) wherein one of said substeps vi-1), vi-2), vi-3) produces part of the $CO_2$-product, a second one of said substeps produces a stream which is entirely recycled to step iv) of one or more vessels and the third one of said substeps produces a stream which is wasted.

The $H_2$-rich stream obtained from step ii) can also be mixed with the feed stream and/or can be fed only during the adsorption step and/or during both pressurization and adsorption step.

In a further option, the step viii) can be performed in the opposite flow direction feeding from the bottom end of the vessel and using the feed instead of the product.

A process according to the invention may also include one or more pressure equalization steps. In a pressure equalization step, a stream withdrawn from a de-pressurization step used as aid to perform a pressurization step or part of a pressurization step. Accordingly, compression power can be saved.

Any pressurization step may be performed top-to-top; top-to-bottom; bottom-to-bottom or bottom-to-top. The preferred embodiments of the invention use pressurization top-to-bottom, i.e. withdrawing a stream from top of a vessel and directing the stream to the bottom of another vessel. Pressurization top-to-bottom generally provides a better separation performance.

The number of pressure equalization (PE) steps may vary. The best number of PE steps may depend on the composition of the feed gas or on the targeted purity of hydrogen. A greater number of pressure equalization steps leads to an increase in hydrogen recovery but increase contamination with impurities at the beginning of the adsorption step, so that the adsorption time has to be reduced to reach a target hydrogen purity. However the above may negatively affect either $CO_2$ recovery or $CO_2$ purity. In some embodiments, the implementation of three PE-steps can be preferred.

The invention achieves reduction of equipment cost and complexity compared to prior art. This advantage is due to the ability of the invention to produce high purity hydrogen and high purity carbon dioxide in a single separation unit, in contrast to traditional processes performed in two or more separation units.

The invention allows matching the $H_2$ product purity and the $CO_2$ product purity of the state-of-the-art, at better recovery figures and comparable or lower energy requirements. The invention shows a separation performance comparable to that of state-of-the-art $CO_2$ separation technologies, e.g. amine wash. The energy consumptions are in line or even lower to reported figures for conventional carbon dioxide recovery units.

The waste stream has a higher calorific value compared to state-of-the-art PSA due to the reduced content of $CO_2$, thus the waste stream is valuable e.g. as feed and/or fuel for a reformer.

DESCRIPTION OF PREFERRED EMBODIMENTS

Figure 1:
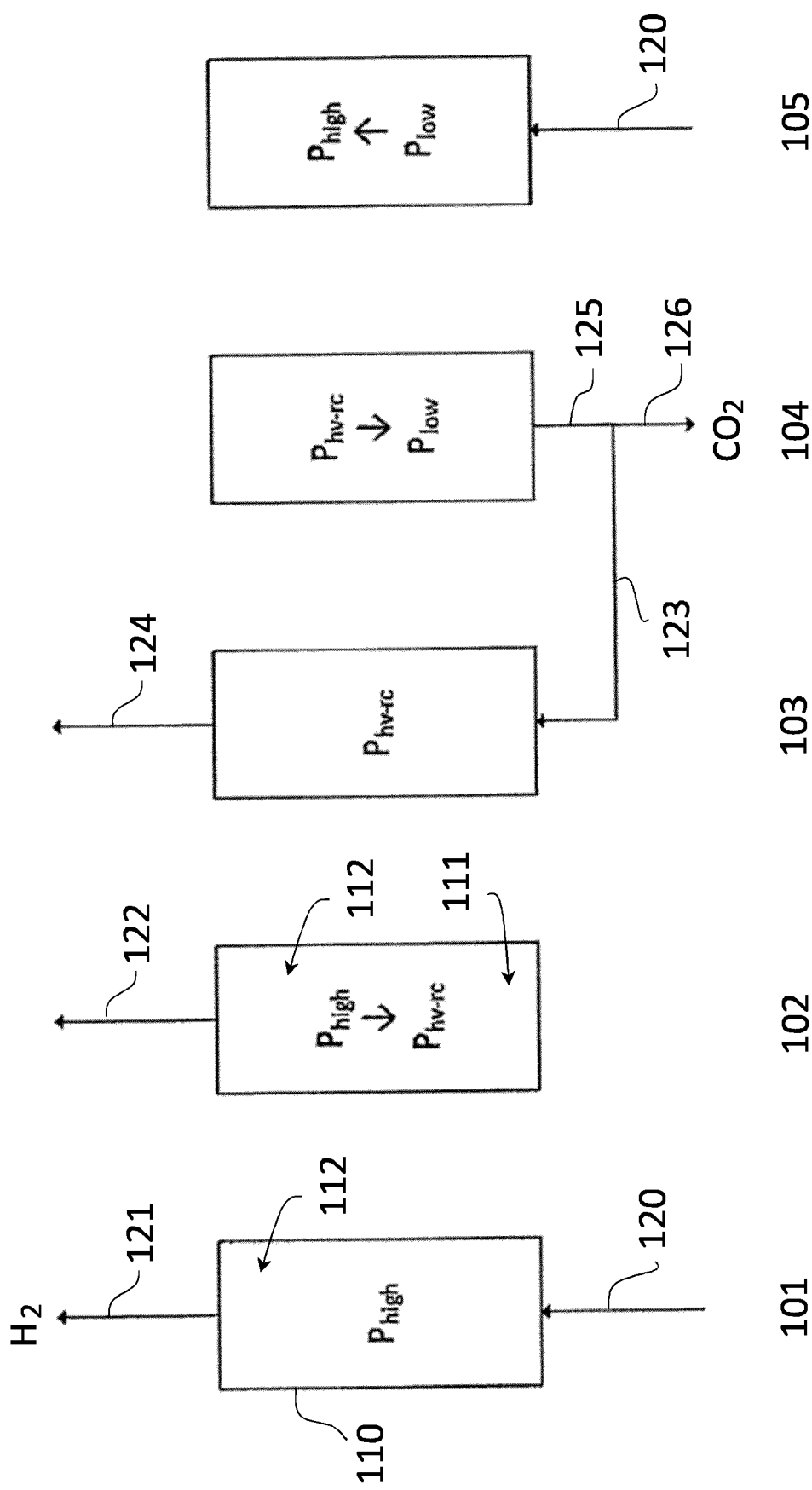
FIG. 1 is a scheme of a first embodiment of the invention.

In FIG. 1, the blocks 101 to 105 denote different process steps performed cyclically by columns 110 of a multiple column setup. Each column contains one or more beds of an adsorbent material with a strong affinity to $CO_2$.

In step 101, a feed gas 120 containing $H_2$, $CO_2$ and impurities is fed to the bottom of the column 110 and traverses the column from bottom to top. $CO_2$ contained in the feed gas is adsorbed by the adsorbent material and a $H_2$ product gas, which is substantially free of $CO_2$, is withdrawn from top. Said step 101 is performed at a high pressure $P_{high}$. The step 101 is conducted in such a way that not all the adsorbent material is saturated with $CO_2$. Particularly, the adsorbent material located in an upper region 112 the column 110 is left unsaturated.

In step 102, the column 110 is de-pressurized to an intermediate pressure $P_{hv-rc}$ (pressure of heavy recycle) and a waste stream 122 is withdrawn from top of the column. This waste stream 122 contains impurities and low amounts of $CO_2$ and medium amounts of $H_2$ and can be used as a fuel.

Step 103 is performed at the pressure $P_{hv-rc}$ that the column reaches at the end of step 102. The column is purged with a $CO_2$-rich stream 123 taken from step 104 performed in the same or another column of the setup and a waste stream 124 is withdrawn from top. Also this waste stream 124 contains impurities and low amounts of $CO_2$ and $H_2$, It generally contains more $CO_2$ than the waste stream 122 and less $H_2$.

The steps 102 and 103 provide a two-steps sequence of removing impurities from the adsorbent material. In step 102, the column 110 is blown down from top and most of the impurities are removed with the waste stream 122. The impurities are removed together with some residual hydrogen. Some $CO_2$ may also desorb due to the reduction of pressure. However, the $CO_2$ desorbed in the lower part 111 of the column is re-captured in the unsaturated upper region 112, resulting in a low content of $CO_2$ in the waste stream 122. Said partial re-capture of desorbed $CO_2$ is made possible by the combination of bottom feed in step 101 and blowdown from top in step 102.

The step 103 achieves a further reduction of impurities contained in the column 110, by purging the column with a high-purity $CO_2$ stream 123. As the purge is carried out bottom to top, the column gas phase is replaced with high purity $CO_2$ starting from the bottom and adsorbed impurities at the bottom of the column are replaced by $CO_2$ due to the stronger affinity of the $CO_2$ for the adsorbent material and to its higher partial pressure. At the end of the step 103 the column 110 contains very little impurities and can produce a substantially pure carbon dioxide stream upon a further depressurization.

Step 104 produces $CO_2$ by de-pressurization of the column 110 from the pressure $P_{hv-rc}$ to a low pressure $P_{low}$ below atmospheric pressure (less than 1 atm abs as above defined). Evacuation is carried out from the bottom end of the column 110, obtaining a substantially pure $CO_2$ stream 125. Part of this stream 125 forms the $CO_2$ purge stream 123 used in step 103 and the remaining part forms a $CO_2$ product 126 which is exported.

At the end of the step 104, the adsorbent material is regenerated and the column 110 is pressurized back to the high pressure $P_{high}$ of step 101 by admitting again the feed 120 to the bottom of the column. At the end of the pressurization step, i.e. when the column 110 reaches an internal pressure of $P_{high}$, the step 101 is performed, starting the withdrawal of the $H_2$ stream 121 from the column top.

The products of the process are therefore the high-purity $H_2$ stream 121 and the high-purity $CO_2$ stream 126.

It shall be noted that the $CO_2$ stream 125 obtained in step 104 is partially used as a process stream 123 (namely a purge stream) to carry out the step 103. Particularly, the purge stream 123 is an aid to remove adsorbed and gas-phase impurities from the column at intermediate pressure.

In a multiple-column setup, this purge stream 123 can be transferred directly from a first source column performing the step 104 to a second target column performing the step 103. More preferably, the stream 123 is stored temporarily in a suitable tank.

In other embodiments, columns of a multiple setup may exchange other process streams, and any exchanged process stream may be transferred directly from one or more source columns to one or more target columns, or may be temporarily stored.

Figure 2:
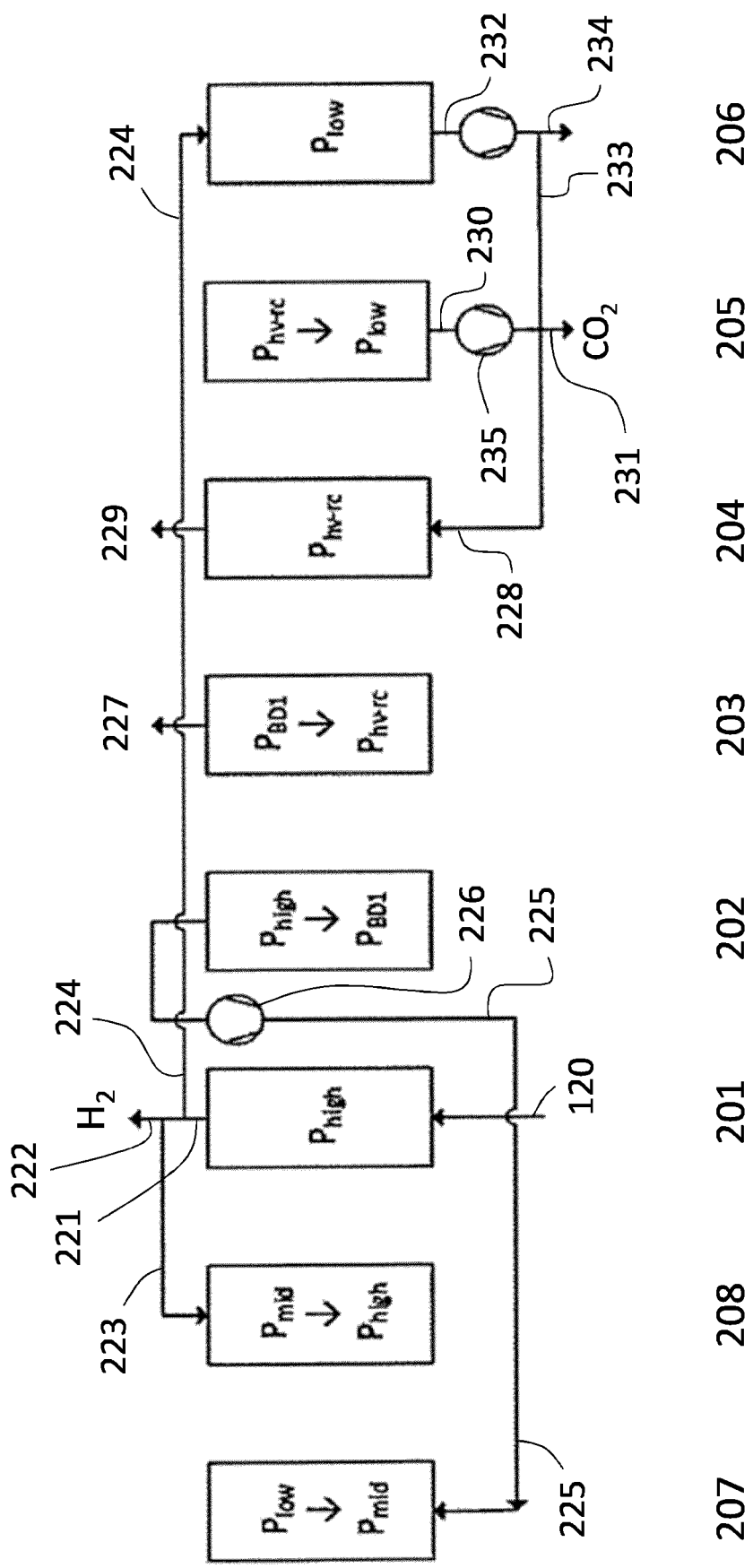
FIG. 2 is a scheme of a second embodiment.

FIG. 2 discloses a second embodiment of the invention involving steps 201 to 208. Compared to FIG. 1, the embodiment of FIG. 2 provides a greater number of process streams exchanged between columns of the setup:

a part of the hydrogen product delivered at the high pressure $P_{high}$ is used as a purge aid to purge a column under vacuum, and another part is used as a pressurizing medium of a column after regeneration;

the depressurization of the column from the above mentioned pressure $P_{high}$ to $P_{hv-rc}$ is carried out in two steps, including a first step passing from $P_{high}$ to a pressure $P_{BD1} > P_{hv-rc}$ and then a second step to reach the target pressure $P_{hv-rc}$ during the first step of depressurization from $P_{high}$ to $P_{BD1}$, a $H_2$-rich recycle stream is obtained which is used as a pressurizing medium;

part of the $CO_2$ product is used as purging aid.

More in detail, the step 201 is an adsorption step similar to the above described step 101. However only a part 222 of the so obtained hydrogen product 221 is exported. A portion 223 of the hydrogen product 221 is used as pressurizing medium in a column performing the step 208 and another portion 224 of the hydrogen product is use to purge a column under vacuum performing the step 206.

In step 202, the column is depressurized from the top end to a first intermediate pressure $P_{BD1}$. The $H_2$-recycle stream 225 leaving the column contains predominantly $H_2$ with impurities and small amounts of $CO_2$. Said stream 225 is used to pressurize a column undergoing step 207 via a compressor 226.

In step 203, the column is further depressurized from the top end, from said first intermediate pressure $P_{BD1}$ to the target heavy recycle pressure $P_{hv-rc}$. The stream 227 leaving the column during the step 203 is rich in impurities and has a low content of $CO_2$ and hydrogen. Depending on the impurities of the stream, it can be wasted or used as fuel, e.g. for a reformer.

In an option, the step 203 includes substeps 203a and 203b. Particularly, an embodiment provides that the first substep 203a is a blowdown to atmospheric pressure and the following substep 203b is an intermediate evacuation where the column reaches a subatmospheric pressure.

Step 204 is performed at the above mentioned heavy recycle pressure $P_{hv-rc}$. The column is purged from the bottom end using a $CO_2$ rich stream 228, either from a column under step 205 or step 206 or a mixture of the two. During this step 204 the impurities that are still adsorbed within the column are displaced by the more strongly adsorbing $CO_2$. The outlet stream 229 is enriched in impurities and contains small amounts of $CO_2$ and $H_2$. Said step 204 can be named heavy recycle step.

Step 205 provides evacuation and generation of the $CO_2$ product (substantially pure $CO_2$). The column is depressurized from the bottom end to the target low pressure $P_{low}$ (less than 1 atm abs) to produce a high purity $CO_2$ stream 230. Part of the $CO_2$ stream 230 concurs to the purge stream 228. A remaining part of said stream 230 forms the $CO_2$ product 231, which is exported.

The step 205 may be split into a first substep 205a and a second substep 205b. In the first substep 205a, the effluent withdrawn from bottom of the column is entirely sent as heavy recycle stream 228 to a column performing the step 204. In the second substep 205b, which is carried out before or after the first substep 205a, the effluent withdrawn from bottom of the column is exported as $CO_2$ product 231.

Step 206 provides a further purge of the column at the low pressure $P_{low}$. The column is purged from the top end under vacuum using the part 224 of the hydrogen product taken from another column performing the step 201. During this step, the top end of the column is cleaned from impurities and $CO_2$.

During the beginning of the vacuum purge 206, the stream 232 has a relatively high content of $CO_2$ and can concur to form the $CO_2$ purge stream 228 for the heavy recycle step 204, as denoted by the line 233 or part of the $CO_2$ product 231. For long purge durations, the remaining part 234 is a waste stream.

The step 206 may be split into a first substep 206a and a second substep 206b and a third substep 206c. In the first substep 206a, the effluent withdrawn from bottom of the column is entirely sent as heavy recycle stream 228 to a column performing the step 204. In the second substep 206b, which is carried out before or after the first substep 206a, the effluent withdrawn from bottom of the column is exported as $CO_2$ product 231. In the third and final substep 206c, the effluent is wasted.

The step 206 helps achieving a full regeneration of the adsorbent material, removing the $CO_2$ still adsorbed at the end of the step 205. In addition, said step 206 provides additional $CO_2$ that can be used for purging another column, e.g. with stream 233. This increase the $CO_2$ recovery because a smaller amount of the $CO_2$ product gas 230 is required for the purge step 204, i.e. the exported $CO_2$ product 231 can be increased. In case the $CO_2$ concentration of stream 232 is sufficiently high, said stream 232 or a part thereof can also directly form part of the $CO_2$ product thereby also increasing the recovery.

The $CO_2$ product stream 231 and the vacuum purge outlet stream 232 are extracted from the column with a compressor 235.

Step 207 is termed recycle pressurization. The column is pressurized from $P_{low}$ to a medium pressure $P_{mid}$ using the hydrogen rich stream 225 delivered by the compressor 226 and withdrawn from a column performing the step 201. The final pressure at the end of this step 207 is usually below the highest pressure $P_{high}$.

In some embodiments, the $H_2$ recycle stream 225 may be mixed with the feed 120 and/or the $H_2$ recycle stream 225 may be admitted into a column also or only during the adsorption step 201.

Step 208 is termed product pressurization. The column undergoes a final pressurization to reach the feed pressure $P_{high}$ using the hydrogen rich product 223 withdrawn from a column performing the step 201.

Said step 208 is preferably performed top to bottom using the hydrogen product 223, as shown. As an alternative, the step 208 may be performed bottom to top using the feed 120.

Figure 3:
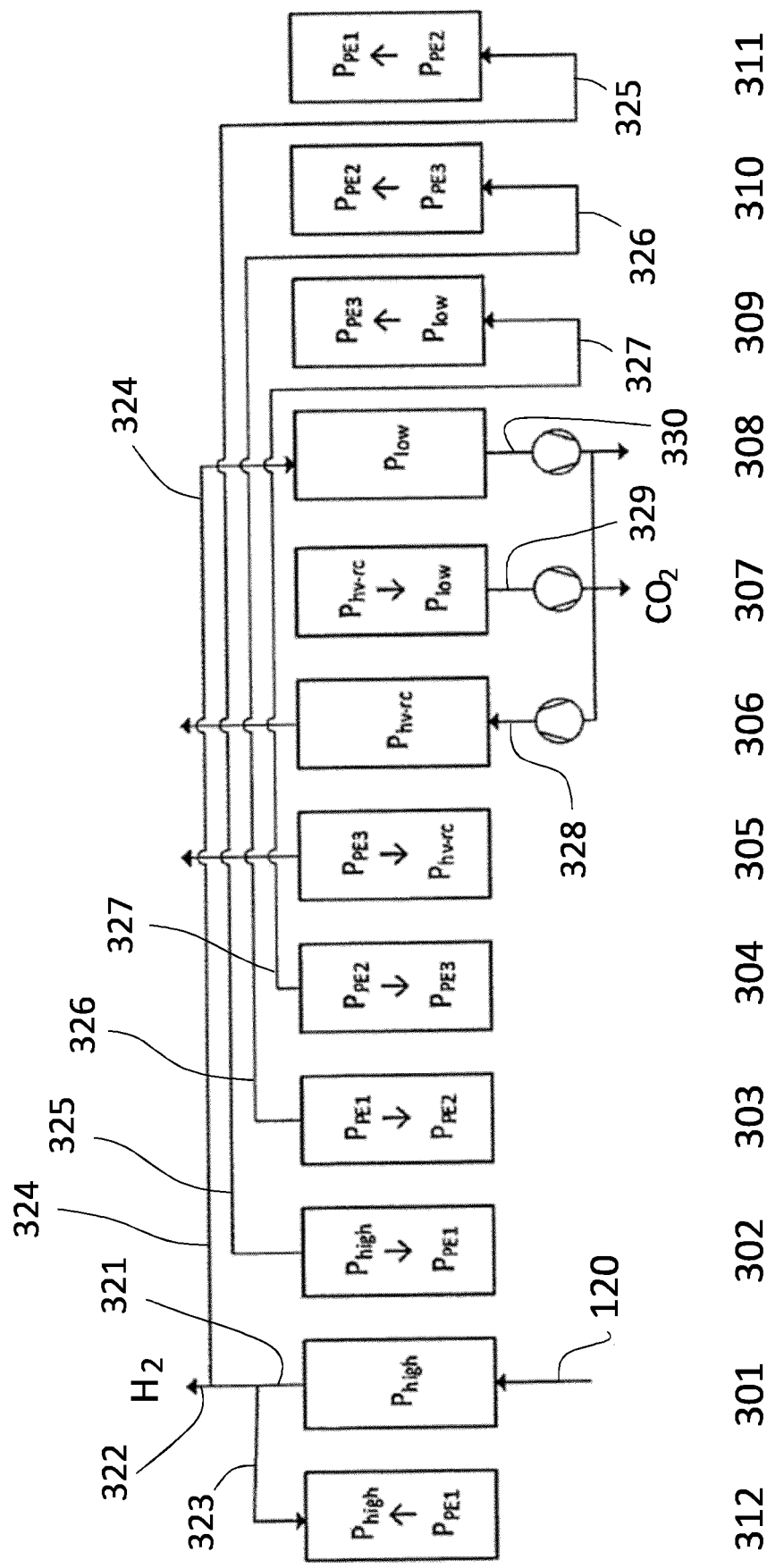
FIG. 3 is a scheme of a third embodiment featuring pressure equalization.

FIG. 3 discloses a third embodiment involving steps 301 to 312 which substantially operates according to the process of FIG. 2 and further includes some pressure equalization steps.

The hydrogen stream 321 obtained at step 301 is partly used as a pressurizing medium, as stream 323 directed to step 312, and as a vacuum purge aid as stream 324 directed to step 308. The remaining part 322 is exported.

The lowering of pressure from $P_{high}$ to $P_{hv-rc}$ includes intermediate de-pressurization steps bringing the column to intermediate pressure $P_{PE1}$, $P_{PE2}$, $P_{PE3}$ in steps 302 to 304 wherein $P_{PE1} > P_{PE2} > P_{PE3}$. Similarly, the raising of pressure from $P_{low}$ to $P_{high}$ (after evacuation and regeneration of the adsorbent material and withdrawal of the $CO_2$ product) includes intermediate pressurization steps reaching the pressure $P_{PE3}$, $P_{PE2}$, $P_{PE1}$ in steps 309 to 311.

A gaseous stream containing mainly hydrogen, some impurities and little $CO_2$ withdrawn from each intermediate de-pressurization step is used as pressurizing medium in a corresponding intermediate pressurization step. During this step, two columns are directly connected, so that the final pressure at the end of the intermediate de-pressurization step is equal to the final pressure of the intermediate pressurization step. This is called pressure equalization (PE). Accordingly, the stream 325 is passed from step 302 to step 311; the stream 326 from step 303 to step 310, and the stream 327 from step 304 to step 309.

After the step 304, the column is further depressurized in step 305 from the column top to reach the pressure $P_{hv\text{-}rc}$. The effluent of said step 305 (withdrawn from the top of the column) contains mainly impurities and little $H_2$ and $CO_2$.

After the step 305 is completed, the column is purged with a $CO_2$-rich stream 328 taken from steps 307 and/or 308. In step 307 the pressure is lowered to $P_{low}$ releasing the $CO_2$ product 329 and in step 308 the column is vacuum purged with some $H_2$ product 324 from step 301 and a vacuum purge stream 330 is extracted.

The $CO_2$-rich stream 328 used in the step 306 may include part of the stream 329 and/or of the stream 330 if the latter has a sufficient concentration of $CO_2$.

After the vacuum purge step 308, the column undergoes the PE-pressurization steps 309 to 311, where pressure is raised with the aid of the above mentioned streams 325, 326 and 327 withdrawn from one or more columns performing the steps 302 to 304.

The number of pressure vessels (columns) may vary. For the implementation of the process of FIG. 1, the minimum number of columns is two, using also storage tanks for the recycle. For the implementation of the process of FIG. 3, including three pressure equalization steps, the minimum number of columns is four. If a continuous feed is required, a number of columns greater than the minimum is appropriate. Preferred embodiments may be implemented preferably with 8 to 12 columns.

EXAMPLES

The following examples relate to processing a feed gas at a temperature of 298 K, a pressure of 30 bar abs and the following composition: $N_2:H_2:CO_2=25:50:25$ (vol %).

Example 1

The above described feed gas is processed with a cycle configuration similar to FIG. 2 but with feed pressurization in the step 208 (i.e. step 208 receives the feed 120 from bottom instead of product from top) and without the second purge (step 206 not used).

A hydrogen purity of 95% and a hydrogen recovery of 90%, together with a $CO_2$ purity of 95% and a recovery of >89% are achieved.

The estimated energy consumption of the process is 2000 kJ/kg$CO_2$ (energy per kg of $CO_2$ separated) including about 370 kJ/kg for recompression of $CO_2$ to 110 bar for storage (for $CO_2$ storage, energy requirement for recompression approx. 370 kJ/kg$CO_2$). This energy consumption was estimated for the production of $H_2$>95% purity, >90% recovery and $CO_2$>90% recovery and >95% purity.

When also the second purge 206 is performed, the above energy consumption drops to around 1500 kJ/kg.

Figure 4:
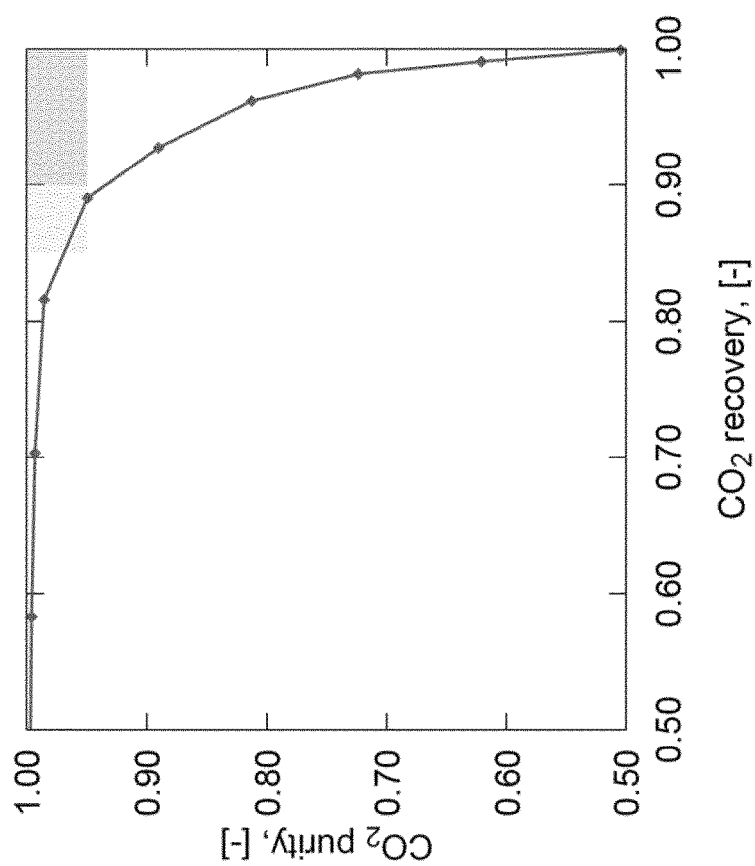
FIG. 4 is a plot of $CO_2$ purity Vs. $CO_2$ recovery in an embodiment of the invention.

FIG. 4 is a plot obtained when optimizing the cycle of the present example to maximize the $CO_2$ purity and recovery, coproduction of $H_2$ at 95% purity and 90% recovery, fixed evacuation pressure.

Example 2

The above described feed gas is processed with a cycle configuration according to FIG. 3:

A $CO_2$ recovery of >90% and a $CO_2$ purity of >95% is achieved, while coproducing hydrogen with a purity >99% and a recovery >86%.

The estimated energy consumption for the separation is approx. 800 kJ/kg$CO_2$, including $CO_2$ compression to 110 bar (approx. 370 kJ/kg$CO_2$ for recompression). This energy consumption was estimated for the production of $H_2$ at purity >95% and recovery >90% and production of $CO_2$ with recovery >90% and purity >95%.

Figure 5:
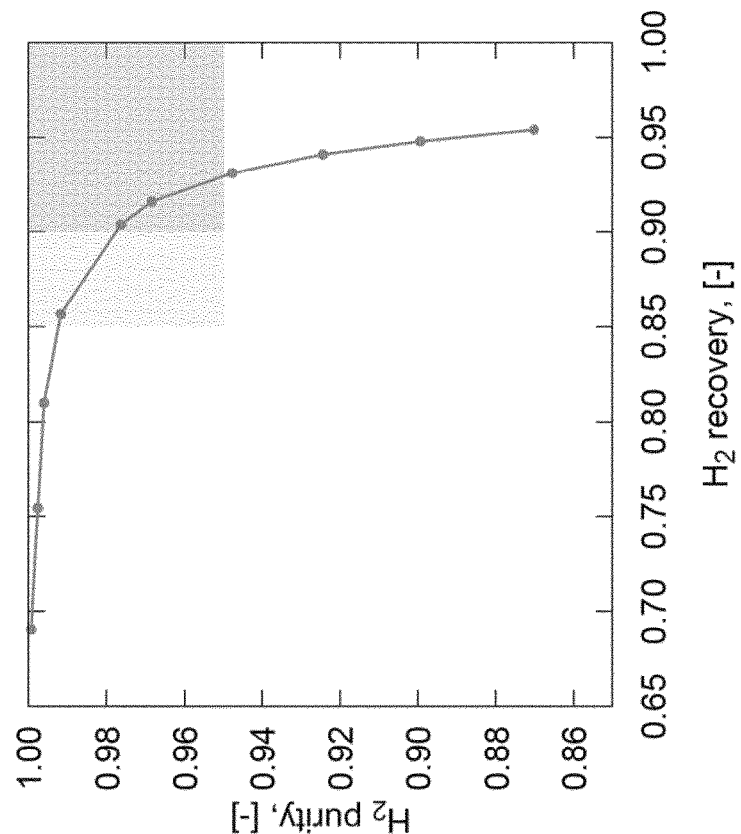
FIG. 5 is a plot of $H_2$ purity Vs. $H_2$ recovery in an embodiment of the invention.

FIG. 5 is a plot obtained when optimizing the cycle depicted in FIG. 3 to maximize the purity and recovery of $H_2$ with coproduction of $CO_2$ at purity 95% and recovery 90% and fixed evacuation pressure.

The invention claimed is:

1. A pressure swing adsorption process (PSA) for recovery of $H_2$ and $CO_2$ from an input feed gas which contains at least 40% vol of $H_2$, the pressure swing adsorption process comprising:
   a) feeding the input feed gas, which contains $H_2$, $CO_2$ and other components or impurities, through an adsorbent material suitable to adsorb $CO_2$, in a pressure vessel under a high pressure, and withdrawing from the pressure vessel a first gas stream which is a $H_2$-rich product gas containing less $CO_2$ than the input feed gas due to adsorption of $CO_2$ in the adsorbent material;
   b) lowering the pressure in the pressure vessel to a target intermediate pressure, which is lower than said high pressure, causing the adsorbent material to release a second gas stream, which is a gas containing impurities, $H_2$ and $CO_2$, and withdrawing said second gas from the pressure vessel;
   c) purging the adsorbent material by passing a $CO_2$-rich purge stream through the adsorbent material, obtaining a third gas which is a purge gas containing impurities desorbed from the material, and withdrawing said third gas from the pressure vessel;
   d) lowering the pressure in the pressure vessel to a low pressure, which is lower than said intermediate pressure, and is a sub-atmospheric pressure, causing the adsorbent material to release under vacuum a fourth gas stream, which is a $CO_2$-rich product gas containing $CO_2$ desorbed from the material, and withdrawing said fourth gas from the pressure vessel;
   e) re-pressurizing the pressure vessel to said high pressure,
   wherein said steps a) to e) are performed cyclically in a pressure vessel or in a plurality of parallel pressure vessels of a multiple pressure vessel setup;
   wherein the sequence of steps performed by each pressure vessel includes an additional purge step which is performed after the step d) and before the step e), and said additional purge step is performed using part of the $H_2$-rich product gas produced by the same or at least another pressure vessel, or said additional purge step is performed using a stream obtained from the blowdown step b) of at least another pressure vessel, and said additional purge step produces an additional $CO_2$-rich product gas;
   wherein as a result of the above steps, $CO_2$ and $H_2$ contained in the input feed gas are recovered separately in the $H_2$-rich product gas and in the $CO_2$-rich product gas respectively, and impurities are removed in at least one further stream which is not recycled into the PSA process; and
   wherein at least part of said additional $CO_2$-rich product gas is used to perform the step c) of at least one pressure vessel, and/or at least part of said additional $CO_2$-rich product gas form part of the $CO_2$ product.

2. The pressure swing adsorption process according to claim 1 wherein at least 50% in volume of the input feed gas is represented by the sum of $H_2$ and $CO_2$.

3. The pressure swing adsorption process according to claim 1 wherein said $H_2$-rich product gas has an $H_2$ purity of at least 90% and/or said $CO_2$-rich product gas has a $CO_2$ purity of at least 90%.

4. The pressure swing adsorption process according to claim 1 wherein the removal of $CO_2$ relative to the $CO_2$ contained in the input feed gas is at least 90% and the rate of recovery of $H_2$ in the $H_2$ stream is at least 90%.

5. The pressure swing adsorption process according to claim 1 wherein step a) is performed by passing the input feed gas from a bottom to a top of the pressure vessel and the first gas stream is withdrawn from top of the pressure vessel.

6. The pressure swing adsorption process according to claim 5 wherein step a) is performed in such a way that at least a portion of the adsorbent material is not saturated with $CO_2$ and the unsaturated adsorbent material is located in the upper part of the pressure vessel.

7. The pressure swing adsorption process according to claim 1 wherein step b) includes lowering the pressure by blowing down the pressure vessel from the upper part of the pressure vessel and the second gas stream is withdrawn from a top of the pressure vessel.

8. The pressure swing adsorption process according to claim 1 wherein step c) is performed by passing the $CO_2$-rich purge stream from a bottom to a top of the adsorbent material.

9. The pressure swing adsorption process according to claim 1 wherein said fourth gas, that is the $CO_2$-rich product gas, is withdrawn from the bottom of the pressure vessel.

10. The pressure swing adsorption process according to claim 1, wherein the step e) includes a plurality of pressurization steps performed with the same pressuring medium or a different pressurizing medium.

11. The pressure swing adsorption process according to claim 1 wherein the $CO_2$-rich purge stream used in step c) includes $CO_2$-rich product gas originated from at least one pressure vessel performing the step d).

12. The pressure swing adsorption process according to claim 1 wherein the step e) includes the feeding, as a pressurizing medium, of at least part of the second gas stream originated from at least one pressure vessel performing the step b).

13. The pressure swing adsorption process according to claim 1 wherein the step e) includes the feeding, as a pressurizing medium, of at least part of the $H_2$-rich product gas originated from at least one pressure vessel performing the step a).

14. The pressure swing adsorption process according to claim 12 wherein step e) includes a first pressurization step e1) with the second gas stream originated from at least one pressure vessel performing the step b), up to an intermediate pressure, followed by a final pressurization step e2) with the $H_2$-rich product gas originated from at least one pressure vessel performing the step a), to reach the feed pressure.

15. The pressure swing adsorption process according to claim 1 wherein the step b) includes: b1) lowering the pressure to a first intermediate pressure and withdrawing during said step b1) a first stream containing hydrogen, impurities and $CO_2$; then b2) lowering the pressure to the target intermediate pressure and withdrawing during said step b2) a second stream containing impurities and $CO_2$ and $H_2$.

16. The pressure swing adsorption process according to claim 15 wherein said first stream obtained in the step b1) of at least one pressure vessel is used as a pressurizing medium in the step e) of at least one pressure vessel.

17. The pressure swing adsorption process according to claim 1, further comprising a plurality of pressure equalization steps, wherein an equalization step comprises sending an equalization stream withdrawn from at least one pressure vessel performing step b) or step d) to at least one pressure vessel performing step e), so that said equalization stream acts as a pressurizing medium for the pressure vessel under pressurization.

18. The pressure swing adsorption process according to claim 17, wherein equalization streams withdrawn from at least one pressure vessel performing step b) are introduced into at least one pressure vessel performing the re-pressurization step e).

19. The pressure swing adsorption process according to claim 1, wherein:
said step b) includes a first depressurization to a first intermediate pressure and production of a first output stream containing hydrogen, impurities and CO2, and a second depressurization to a second intermediate pressure and production of a second stream containing impurities and $CO_2$ and $H_2$;
said additional purge step is performed under vacuum; and
said step e) includes a first pressurization by feeding in the pressure vessel at least part of the first output stream from said first depressurization of step b), and a final pressurization by feeding in the pressure vessel a part of the $H_2$-rich product gas produced by step a).

20. The pressure swing adsorption process according to claim 19, wherein the pressure swing adsorption process is performed in a multiple pressure vessel setup, including a plurality of pressure vessels running in parallel, and the process comprises at least one of the following:
the additional purge step comprising purge under vacuum using part of the $H_2$-rich product gas produced by step a) in at least another pressure vessel of the setup;
the first pressurization of step e) comprising feeding at least part of the first output stream from the first depressurization of step b) of at least another pressure vessel of the setup; or
the final pressurization of step e) comprising feeding in the pressure vessel a part of the $H_2$-rich product gas produced by step a) of at least another pressure vessel of the setup.

21. The pressure swing adsorption process according to claim 19, wherein the $CO_2$-rich purge stream of step c) includes at least a portion of the first $CO_2$-rich product gas from step d), at least a portion of the additional $CO_2$-rich product gas from the additional purge step, or a mixture thereof.

22. The pressure swing adsorption process according to claim 19, wherein the additional purge step includes at least one of: a first substep, a second substep, and a third substep, wherein the first substep produces part of the $CO_2$-rich product gas, the second substep produces a $CO_2$-rich stream which is entirely recycled to step c) of one or more pressure vessels, and the third substep produces a CO2-rich stream which is wasted.

* * * * *